United States Patent
Proscia (10) Patent No.: US 10,393,030 B2
(45) Date of Patent: Aug. 27, 2019

(54) PILOT INJECTOR FUEL SHIFTING IN AN AXIAL STAGED COMBUSTOR FOR A GAS TURBINE ENGINE

(71) Applicant: United Technologies Corporatoin, Farmington, CT (US)

(72) Inventor: William Proscia, Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 224 days.

(21) Appl. No.: 15/283,470

(22) Filed: Oct. 3, 2016

(65) Prior Publication Data

US 2018/0094590 A1    Apr. 5, 2018

(51) Int. Cl.

| F23R 3/14 | (2006.01) |
|---|---|
| F23R 3/28 | (2006.01) |
| F02C 9/26 | (2006.01) |
| F02C 7/22 | (2006.01) |
| F23R 3/12 | (2006.01) |

(Continued)

(52) U.S. Cl.
CPC .............. *F02C 9/26* (2013.01); *F02C 7/222* (2013.01); *F23N 1/002* (2013.01); *F23N 1/005* (2013.01); *F23R 3/06* (2013.01); *F23R 3/12* (2013.01); *F23R 3/286* (2013.01); *F23R 3/343* (2013.01); *F23R 3/346* (2013.01); *F23R 3/36* (2013.01); *F05D 2220/323* (2013.01);

(Continued)

(58) Field of Classification Search
CPC .... F23R 3/14; F23R 3/286; F23R 3/34; F23R 3/36; F23R 3/343; F23R 3/346; F02C 9/263; F02C 9/28; F02C 7/222; F23N 1/00; F23N 2037/08
See application file for complete search history.

(56) References Cited

U.S. PATENT DOCUMENTS 5,319,935 A * 6/1994 Toon ...................... F23C 6/047
                                                              239/403
5,323,614 A * 6/1994 Tsukahara ................. F23R 3/34
                                                              60/737

(Continued)

FOREIGN PATENT DOCUMENTS

| EP | 1760403 A2 | 3/2007 |
| EP | 2072899 A1 | 6/2009 |
| WO | 02061339 A1 | 8/2002 |

OTHER PUBLICATIONS

European Search Report, European Application No. 17194360.8, dated Mar. 26, 2018, European Patent Office; European Search Report 9 pages.

Primary Examiner — William H Rodriguez
(74) Attorney, Agent, or Firm — Cantor Colburn LLP (57) ABSTRACT

Pilot fuel injectors for combustors of gas turbine engines are provided. The pilot fuel injectors include a swirler having an exit into a combustion chamber of the combustor and a nozzle located within the swirler. The nozzle includes a primary fuel circuit configured to atomize fuel dispensed therethrough and a secondary fuel circuit having a first sub circuit having at least one injection aperture a first injection depth from the exit of the swirler and a second subcircuit having at least one second injection aperture located at a second injection depth from the exit of the swirler, wherein the first injection depth is greater than the second injection depth.

19 Claims, 6 Drawing Sheets

(51) Int. Cl.
*F23R 3/34* (2006.01)
*F23N 1/00* (2006.01)
*F23R 3/06* (2006.01)
*F23R 3/36* (2006.01)

(52) U.S. Cl.
CPC ...... *F05D 2240/35* (2013.01); *F23N 2037/08* (2013.01); *F23R 3/14* (2013.01); *Y02T 50/675* (2013.01)

(56) References Cited

U.S. PATENT DOCUMENTS

| | | | | |
|---|---|---|---|---|
| 5,361,586 | A * | 11/1994 | McWhirter | F23D 14/02 60/737 |
| 5,394,688 | A * | 3/1995 | Amos | F23C 7/006 60/39.23 |
| 5,647,215 | A * | 7/1997 | Sharifi | F23D 17/002 239/431 |
| 5,749,219 | A * | 5/1998 | DuBell | F02C 7/26 60/733 |
| 5,816,049 | A * | 10/1998 | Joshi | F23C 7/004 60/737 |
| 6,363,726 | B1 * | 4/2002 | Durbin | F23R 3/14 60/748 |
| 6,367,262 | B1 * | 4/2002 | Mongia | F23R 3/14 60/748 |
| 6,381,964 | B1 * | 5/2002 | Pritchard, Jr. | F23R 3/14 60/746 |
| 6,412,282 | B1 * | 7/2002 | Willis | F23C 6/047 60/737 |
| 6,418,726 | B1 * | 7/2002 | Foust | F23R 3/14 60/748 |
| 7,464,553 | B2 * | 12/2008 | Hsieh | F23R 3/14 60/740 |
| 9,803,552 | B2 * | 10/2017 | Zhang | F02C 7/222 |
| 2002/0162333 | A1 * | 11/2002 | Zelina | F23R 3/14 60/776 |
| 2004/0050057 | A1 * | 3/2004 | Bland | F23D 14/82 60/737 |
| 2006/0123792 | A1 * | 6/2006 | Xu | F23R 3/14 60/737 |
| 2007/0028618 | A1 * | 2/2007 | Hsiao | F23R 3/14 60/737 |
| 2007/0271927 | A1 * | 11/2007 | Myers | F02C 9/28 60/776 |
| 2008/0289341 | A1 * | 11/2008 | Ishizaka | F23R 3/14 60/748 |
| 2009/0111063 | A1 * | 4/2009 | Boardman | F23R 3/14 431/8 |
| 2009/0113893 | A1 * | 5/2009 | Li | F23R 3/14 60/737 |
| 2010/0183991 | A1 * | 7/2010 | Kostlin | F23C 7/004 431/9 |
| 2010/0263382 | A1 * | 10/2010 | Mancini | F23R 3/14 60/742 |
| 2011/0101131 | A1 * | 5/2011 | Milosavljevic | F23C 7/004 239/399 |
| 2011/0113787 | A1 * | 5/2011 | Milosavljevic | F23R 3/343 60/776 |
| 2013/0067920 | A1 * | 3/2013 | Fox | F23R 3/14 60/738 |
| 2013/0104554 | A1 * | 5/2013 | Bode | F23D 11/38 60/740 |
| 2013/0125556 | A1 * | 5/2013 | Hoke | F02C 7/228 60/773 |
| 2014/0000264 | A1 * | 1/2014 | Saito | F23R 3/14 60/748 |
| 2015/0159877 | A1 * | 6/2015 | Stoia | F02C 7/222 60/735 |
| 2015/0285501 | A1 * | 10/2015 | DiCintio | F23R 3/14 60/740 |
| 2016/0061452 | A1 * | 3/2016 | Walker | F23R 3/286 60/737 |
| 2016/0305327 | A1 * | 10/2016 | Patel | F23R 3/286 |
| 2016/0363319 | A1 * | 12/2016 | Monahan | F23R 3/286 |
| 2018/0135521 | A1 * | 5/2018 | Jung | F02C 7/222 |

* cited by examiner

PILOT INJECTOR FUEL SHIFTING IN AN AXIAL STAGED COMBUSTOR FOR A GAS TURBINE ENGINE

BACKGROUND

The subject matter disclosed herein generally relates to gas turbine engines and, more particularly, to dynamic combustion control for gas turbine engines.

Lean-staged liquid-fueled aeroengine combustors (e.g., within gas turbine engines) can provide low $NO_x$ and particulate matter emissions, but may be prone to combustion instabilities. One approach to stabilizing lean-staged combustion systems is to use radial staging where all the fuel is injected at the front-end of the combustor into different radial zones. However, there are several mechanisms that can cause combustion instabilities in radial-staged lean combustors. Such mechanisms can include, but is not limited to, heat release concentrated in the front of the combustor and weak flame holding at certain operating conditions where main stage air can dilute a pilot stage fuel-air ratio. Accordingly, it may be advantageous to improve lean-staged combustion in gas turbine engines.

SUMMARY

According to some embodiments, pilot fuel injectors for combustors of gas turbine engines are provided. The pilot fuel injectors include a swirler having an exit into a combustion chamber of the combustor and a nozzle located within the swirler. The nozzle includes a primary fuel circuit configured to atomize fuel dispensed therethrough and a secondary fuel circuit having a first subcircuit having at least one injection aperture a first injection depth from the exit of the swirler and a second subcircuit having at least one second injection aperture located at a second injection depth from the exit of the swirler, wherein the first injection depth is greater than the second injection depth.

In addition to one or more of the features described herein, or as an alternative, further embodiments of the pilot fuel injectors may include that the nozzle defines a nozzle axis, wherein the apertures of one or both of the first and second subcircuits are oriented to dispense fuel in a direction radially relative to the nozzle axis.

In addition to one or more of the features described herein, or as an alternative, further embodiments of the pilot fuel injectors may include that the nozzle defines a nozzle axis, wherein the apertures of the first subcircuit are oriented to dispense fuel in a direction circumferentially relative to the nozzle axis.

In addition to one or more of the features described herein, or as an alternative, further embodiments of the pilot fuel injectors may include that the swirler dispenses air in a swirler direction and wherein the direction of orientation of the apertures of the first subcircuit is directed in a direction opposite the swirler direction.

In addition to one or more of the features described herein, or as an alternative, further embodiments of the pilot fuel injectors may include that the apertures of the second subcircuit are oriented to dispense fuel in a direction circumferentially relative to the nozzle axis and in a direction that is the same as the swirler direction.

In addition to one or more of the features described herein, or as an alternative, further embodiments of the pilot fuel injectors may include a fuel injection controller configured to control fuel flow through the first and second subcircuits.

In addition to one or more of the features described herein, or as an alternative, further embodiments of the pilot fuel injectors may include a fuel regulation unit that is operably controlled by the fuel injection controller and configured to restrict or enable flow to one or both of the first and second subcircuits.

In addition to one or more of the features described herein, or as an alternative, further embodiments of the pilot fuel injectors may include that the fuel regulation unit is one of a mechanical flow divider valve or an electrically actuated flow divider valve.

In addition to one or more of the features described herein, or as an alternative, further embodiments of the pilot fuel injectors may include that the fuel injection controller is configured to (i) direct more fuel through the first subcircuit during a high power operation of the gas turbine engine and (ii) direct more fuel through the second subcircuit during a low power operation of the gas turbine engine.

In addition to one or more of the features described herein, or as an alternative, further embodiments of the pilot fuel injectors may include that a tip of the nozzle is located an immersion depth from the exit of the swirler, and wherein the second injection depth is greater than the immersion depth.

According to some embodiments, aircraft engines are provided. The aircraft engines include an axially-staged lean-lean combustor defining a combustion chamber, the combustor having a pilot fuel injector positioned at a forward end of the combustor. The pilot fuel injector includes a swirler having an exit into the combustion chamber and a nozzle located within the swirler. The nozzle includes a primary fuel circuit configured to atomize fuel dispensed therethrough and a secondary fuel circuit having a first subcircuit having at least one injection aperture a first injection depth from the exit of the swirler and a second subcircuit having at least one second injection aperture located at a second injection depth from the exit of the swirler, wherein the first injection depth is greater than the second injection depth.

In addition to one or more of the features described herein, or as an alternative, further embodiments of the aircraft engine may include that the nozzle defines a nozzle axis, wherein the apertures of one or both of the first and second subcircuits are oriented to dispense fuel in a direction radially relative to the nozzle axis.

In addition to one or more of the features described herein, or as an alternative, further embodiments of the aircraft engine may include that the nozzle defines a nozzle axis, wherein the apertures of the first subcircuit are oriented to dispense fuel in a direction circumferentially relative to the nozzle axis.

In addition to one or more of the features described herein, or as an alternative, further embodiments of the aircraft engine may include that the swirler dispenses air in a swirler direction and wherein the direction of orientation of the apertures of the first subcircuit is directed in a direction opposite the swirler direction.

In addition to one or more of the features described herein, or as an alternative, further embodiments of the aircraft engine may include that the apertures of the second subcircuit are oriented to dispense fuel in a direction circumferentially relative to the nozzle axis and in a direction that is the same as the swirler direction.

In addition to one or more of the features described herein, or as an alternative, further embodiments of the aircraft engine may include a fuel injection controller configured to control fuel flow through the first and second subcircuits.

In addition to one or more of the features described herein, or as an alternative, further embodiments of the aircraft engine may include a fuel regulation unit that is operably controlled by the fuel injection controller and configured to restrict or enable flow to one or both of the first and second subcircuits.

In addition to one or more of the features described herein, or as an alternative, further embodiments of the aircraft engine may include that the fuel injection controller is configured to (i) direct more fuel through the first subcircuit during a high power operation of the gas turbine engine and (ii) direct more fuel through the second sub circuit during a low power operation of the gas turbine engine.

In addition to one or more of the features described herein, or as an alternative, further embodiments of the aircraft engine may include that a tip of the nozzle is located an immersion depth from the exit of the swirler, and wherein the second injection depth is greater than the immersion depth.

In addition to one or more of the features described herein, or as an alternative, further embodiments of the aircraft engine may include at least one radially oriented main fuel injector located at a position aftward from the pilot fuel injector and configured to inject fuel into the combustion chamber.

Technical effects of embodiments of the present disclosure include aircraft and combustors of aero engines having a fuel injection controller configured to perform fuel shifting between different fuel injectors of the combustor to optimize flame configuration within a combustion chamber.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "##" that is shown in FIG. X may be labeled "X##" and a similar feature in FIG. Z may be labeled "Z##." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1A:
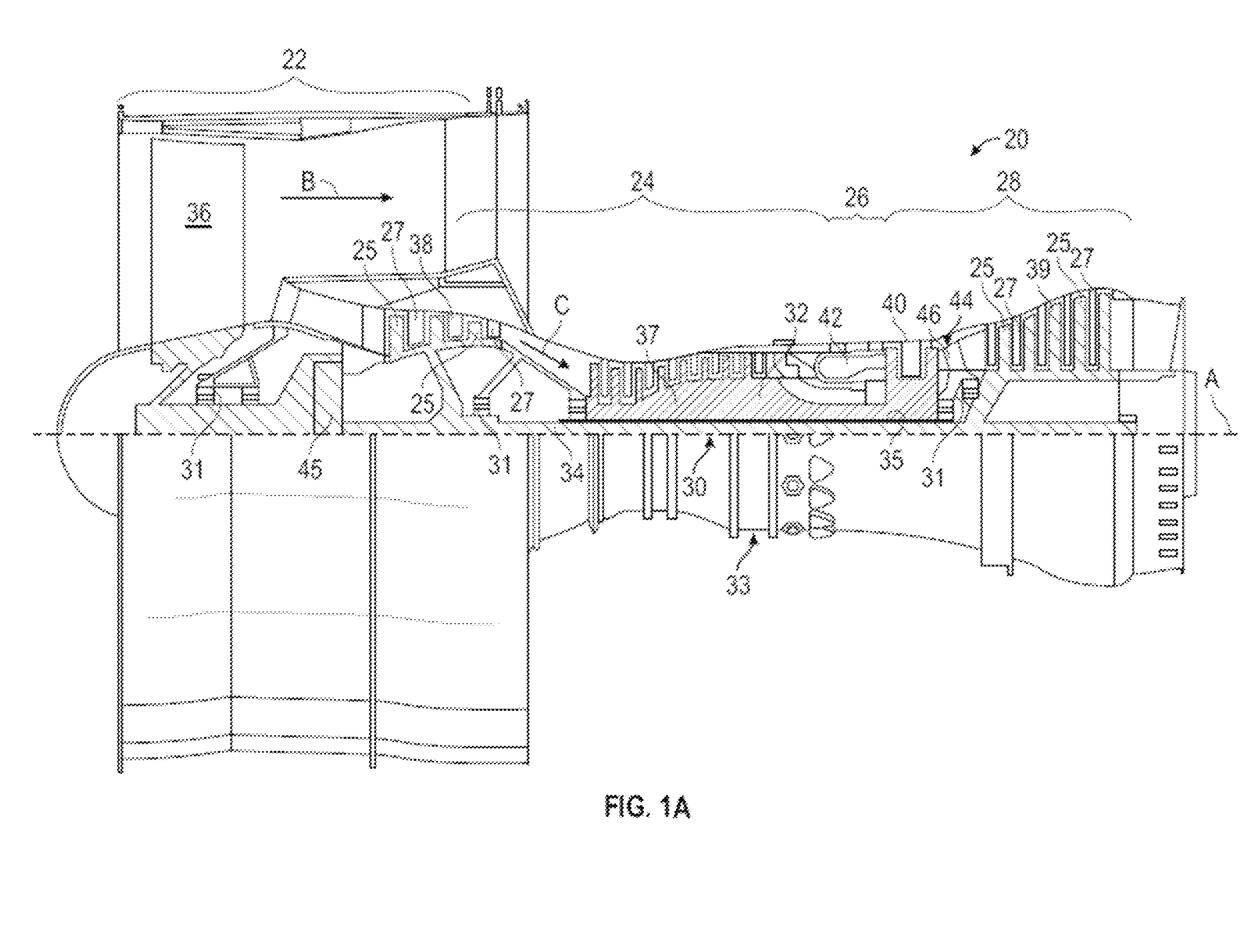
FIG. 1A is a schematic cross-sectional illustration of a gas turbine engine architecture that may employ various embodiments disclosed herein.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although one architecture for a gas turbine engine is depicted in the disclosed non-limiting embodiment, it should be understood that the concepts described herein are not limited to use with the shown and described configurations, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 1B:
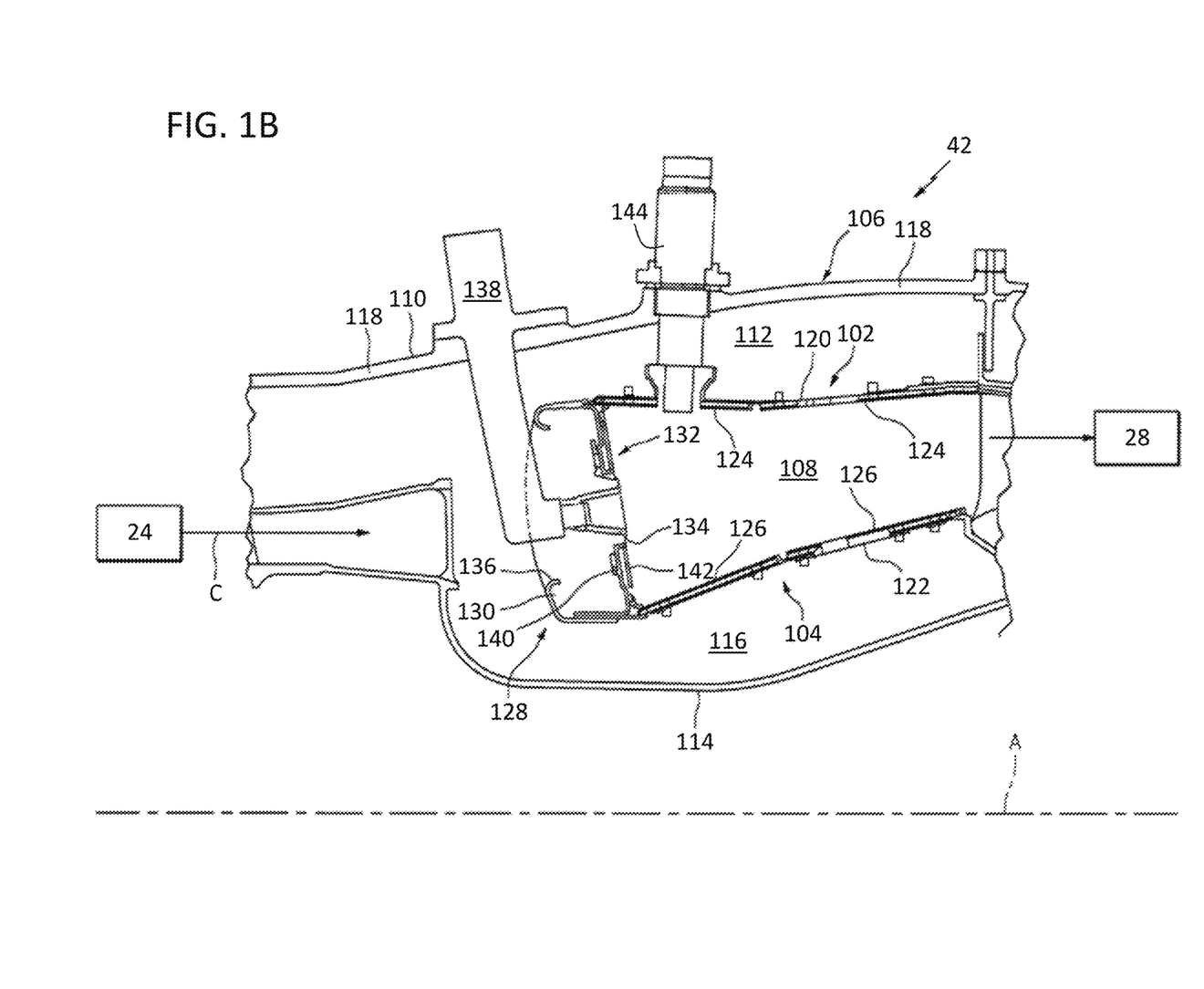
FIG. 1B is a schematic illustration of a combustor section of a gas turbine engine that may employ various embodiments disclosed herein.

With reference to FIG. 1B, an enlarged schematic illustration of the combustor 42 is shown. The combustor 42 can be annular and generally includes an outer wall 102, an inner wall 104 and a diffuser case module 106. The outer wall 102 and the inner wall 104 are spaced apart radially with respect to axis A and such that a combustion chamber 108 is generally defined there between. The combustion chamber 108 is generally annular in shape. The outer wall 102 is spaced radially inward from a diffuser outer case 110 of the diffuser case module 106, with an annular outer plenum 112 being defined there between. The inner wall 104 is spaced radially outward from a diffuser inner case 116 of the diffuser case module 106 to define an annular inner plenum 116. It should be understood that although a particular combustor is illustrated, other combustor types with various combustor wall and case arrangements will also benefit here from. For instance, the diffuser outer case 110 maybe an integral part of an engine case structure 118.

Furthermore, although shown and described with respect to an aircraft engine, those of skill in the art will appreciate that embodiments provided herein can be employed within land-based or sea-based gas turbine engines and/or so industrial gas turbines (IGT). Furthermore, combustors as provided herein can be annular combustors, can combustors, or other types of combustors as known in the art. Further, in some embodiments, such as in industrial gas turbines, as known, water may be injected into the combustion chamber and used for emission control. Such water and/or associated water supply can be used as a cooling source.

Each combustor wall 102, 104 generally includes a respective support shell 120, 122, respectively, that supports one or more liners 124, 126, respectively, mounted to a hot side of the respective support shell 120, 122. The liners 124, 126 directly define the combustion chamber 108 that contains the flow of combustion products for driving the turbine section 28. The liners 124, 126 can be comprised of a plurality of Impingement Film Float (IFF) panels orientated in a generally rectilinear liner array. Each panel can be manufactured of, for example, a nickel based super alloy, ceramic, or other temperature resistant material. In non-limiting embodiments, the array of panels of the liners can include a plurality of forward liner panels and a plurality of aft liner panels that line the hot side of the outer shell 120 and a plurality of forward liner panels and a plurality of aft liner panels that line the hot side of the inner shell 122.

The combustor 42 also includes a forward assembly 128 immediately downstream of the compressor section 24 to guide compressed airflow C therefrom. The forward assembly 128 generally includes an annular hood 130, a bulkhead assembly 132, and a plurality of swirlers 134 (one shown) spaced circumferentially about engine axis A.

The annular hood 130 extends radially between, and in the non-limiting embodiment of FIG. 1B, is secured to, the forward most ends of the walls 102, 104. A plurality of circumferentially distributed hood ports 136 accommodate a respective plurality of first fuel injectors 138 as well as direct compressed air C into the forward end of the combustion chamber 108 through the associated swirler 134. Each first fuel injector 138, such as a pilot fuel injector, can be secured to the diffuser case module 106 to project through one of the hood ports 136 and the respective swirler 134. It should be appreciated that various architectures of the forward assembly 128 can also benefit here from.

Each swirler 134, as shown in FIG. 1B, is circumferentially aligned with a respective hood port 136 to project through the bulkhead assembly 132. The bulkhead assembly 132 includes a bulkhead support shell 140 secured to the walls 102, 104, and a plurality of circumferentially distributed bulkhead heat shields 142 secured to the bulkhead support shell 140 around each swirler 134.

The forward assembly 128 and walls 102, 104 are configured to introduce core combustion air C into the forward end of the combustion chamber 108 while the remainder enters from the annular outer plenum 112 and the annular inner plenum 116. The plurality of first fuel injectors (or pilot fuel injector) 138 and respective swirlers 134 facilitate the generation of a blended fuel-air mixture that supports combustion in the combustion chamber 108. An igniter 144 is provided to start and enable combustion within the combustion chamber 108.

Figure 2:
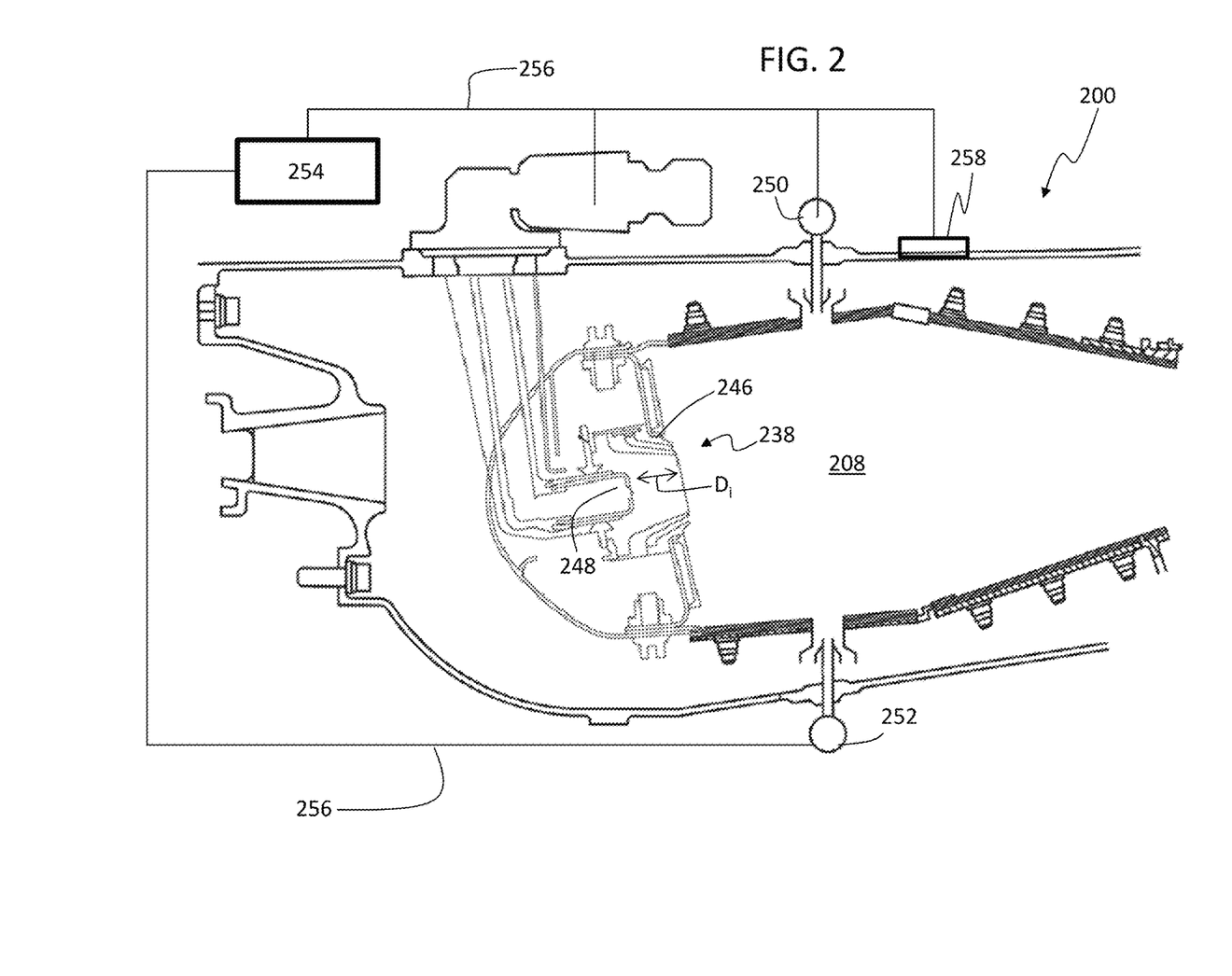
FIG. 2 is a schematic illustration of a combustor in accordance with an embodiment of the present disclosure.

Additionally, the combustor 42 can be configured with one or more second fuel injectors (e.g., axially staged, main fuel injectors), such as shown in FIG. 2 (second fuel injectors 250, 252). The second fuel injectors can be configured or structured similar to the first fuel injectors 138 (e.g., including swirlers, shells, supports, etc.). A difference between the second fuel injectors and the first fuel injectors 138 may be the direction of injection of fuel into the combustion chamber 108. The first fuel injectors 138 inject fuel in a first direction (e.g., substantially axially along the axis A) whereas the second fuel injectors inject fuel in a second direction substantially perpendicular to axis A or different from the first direction. In some embodiments, the second fuel injectors can be oriented with an angle with respect to the first fuel injector(s). Those of skill in the art will appreciate that a plurality of second fuel injectors can be positioned above and/or below the combustion chamber 108 such that fuel can be injected from either or both the inner diameter or the outer diameter of the combustion chamber 108 (see, e.g., FIG. 2).

As provided in accordance with embodiments of the present disclosure, lean-staging can be achieved by axially distributing the fuel injection with a front-end pilot injector (e.g., first fuel injector 138) and a downstream main injector (e.g., second fuel injector) to axially distribute the heat release similar to a Rich Quench Lean design, as known in the art. However, embodiments provided herein have lean/lean combustion to enable low $NO_x$ and particulate emissions. Such configuration is different from radial staged designs where all the fuel is injected at the front-end of the combustor.

In accordance with the present disclosure, the pilot and main injector(s) can each include measures to control the combustion dynamics and/or combustion instabilities within various zones of the combustion chamber. For example dynamics can be controlled or measured within an injector that is based on a high shear design with dual secondary fuel injection locations, with dynamic control for upstream injection for improved high power emissions and downstream injection for low power tone mitigation.

Turning now to FIG. 2, a combustor 200 in accordance with a non-limiting embodiment of the present disclosure is shown. The combustor 200 can be similar to that shown and described above and thus similar features and elements will not be described again. The combustor 200 includes a first (pilot) fuel injector 238 located at a forward end of a combustion chamber 208 defined by the combustor 200. The first fuel injector 238 can include a swirler 246 and a nozzle 248. In one embodiment, the first fuel injector 238 can be a high shear fuel injector with the nozzle 248 being a duplex fuel nozzle and the swirler 246 being a radial inflow swirler.

The first fuel injector 238, as a pilot fuel injector, can include primary fuel injection and secondary fuel injection, as known in the art. For example, the pilot fuel injector can have a duplex fuel nozzle with primary and secondary fuel circuits. Fuel supplied through the primary circuit can be through a pressure atomizer or other orifice at the tip of the fuel nozzle and can disperse axially relative to the nozzle 248. The primary circuit can provide good atomization at low fuel and/or low power and can be used for ignition and/or engine starting. The secondary circuit can include multiple orifices that provide liquid jets of fuel in a cross-flow within swirling air of the swirler 246. The secondary circuit can be used at high power operating conditions. The secondary circuit can provide fuel radially relative to the nozzle 248 (i.e., directed toward the swirler 246 that is circumferentially surrounding the nozzle 248).

As shown, the combustor 200 also includes an outer second fuel injector 250 and an inner second fuel injector 252 (e.g., main OD and ID fuel injectors). As will be appreciated by those of skill in the art, the outer second fuel injector 250 can inject fuel from an outer diameter of the combustion chamber 208 and the inner second fuel injector 252 can inject fuel from an inner diameter of the combustion chamber 208. Each second fuel injector 250, 252 can include swirlers or other features as described herein and/or as appreciated by those of skill in the art. Those of skill in the art will appreciate that various other configurations are possible without departing from the scope of the present disclosure. For example, combustors with one-sided main fuel injectors (e.g., ID or OD) can employ embodiments of the present disclosure. Further, circumferentially aligned main fuel injectors or circumferentially misaligned main fuel injectors can employ embodiments disclosed herein.

Each of the fuel injectors 238, 250, 252 can be operably controlled by a fuel injection controller 254. The fuel injection controller 254 can be in communication with the fuel injectors 238, 250, 252 over a communication network 256. In some embodiments, the communication network 256 can be electronic and/or electrical such that control signals can be communicated from the fuel injection controller 254 to one or more of the fuel injectors 238, 250, 252. In other embodiments, the communication network 256 can be mechanical or fluid in nature, wherein flow restrictors, flow regulators, valves, and/or fluid pressure controllers, etc. can be used to control fluid flow through the fuel injectors 238, 250, 252 and into the combustion chamber 208. Various other control mechanisms can be employed as will be appreciated by those of skill in the art.

In some embodiments, the first fuel injector 238 is a pilot fuel injector and the second fuel injectors 250, 252 are main fuel injectors. The fuel injection controller 254 is configured to control fuel flow through the fuel injectors 238, 250, 252, and thus can perform fuel shifting operation to inject fuel into the combustion chamber 208 based on various modes of operation and/or in response to operating conditions of an aircraft in which the combustor 200 is located.

Combustor instabilities can be sensitive to fuel nozzle immersion depth in high shear injectors. FIG. 2 schematically illustrates an immersion depth $D_i$ as a distance between an end or tip of the nozzle 248 and an exit of the swirler 246 as it opens into the combustion chamber 208 (e.g., a depth of a primary circuit fuel flow from the nozzle 248). The immersion depth $D_i$ of the fuel nozzle 248 within the swirler 246 influences fuel jet penetration, atomization, and filming on an inner swirler surface due to fuel from the secondary circuit of the nozzle 248. Embodiments provided herein are directed to enabling variable immersion or injection depth of the secondary fuel circuit of the nozzle.

For example, in accordance with embodiments of the present disclosure, fuel injection nozzles are provided with a secondary circuit having multiple injection points (e.g., subcircuits) located at different injection depths relative to a swirler exit. Fuel shifting can be performed between upstream and downstream injection points along the nozzle to vary an effective injection depth and thus impact how the secondary fuel flow from the pilot injector behaves. In accordance with some embodiments, using two secondary subcircuits, the injection of fuel from the secondary circuit can be controlled and/or scheduled as a function of engine operating conditions.

Figure 3A:
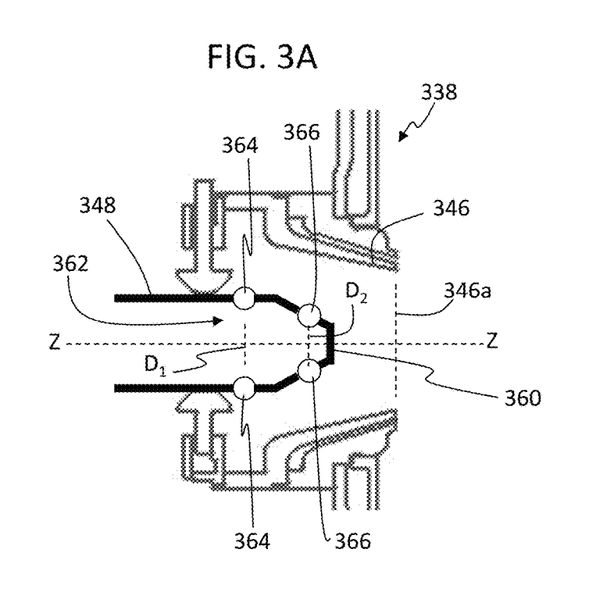
FIG. 3A is a schematic illustrates of a pilot fuel injector in accordance with an embodiment of the present disclosure.
Figure 3B:
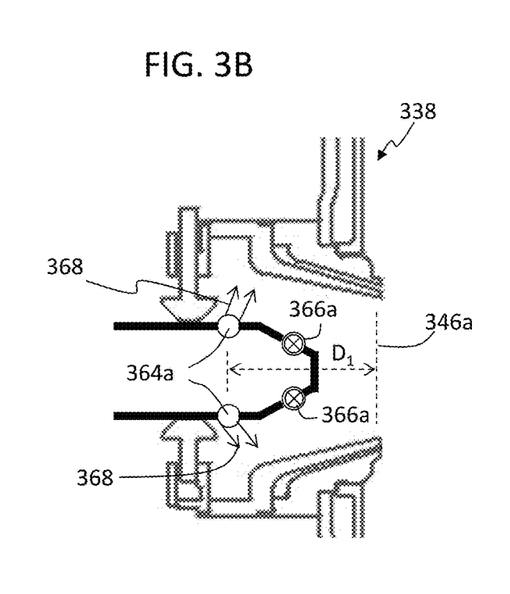
FIG. 3B is a schematic illustration of fuel injection from the pilot fuel injector of FIG. 3A in a first mode of operation.
Figure 3C:
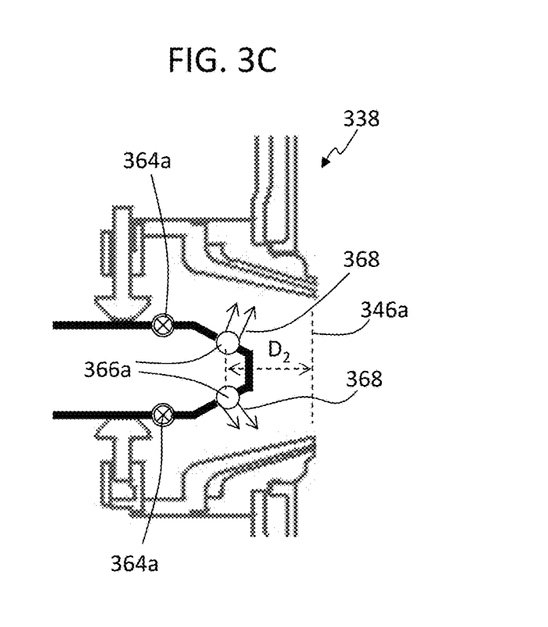
FIG. 3C is a schematic illustration of fuel injection from the pilot fuel injector of FIG. 3A in a second mode of operation.

For example, turning now to FIGS. 3A-3C, schematic illustrations of a pilot fuel injector 338 in accordance with an embodiment of the present disclosure is shown. FIG. 3A illustrates the features of the pilot fuel injector 338, FIG. 3B schematically illustrates fuel injection from the pilot fuel injector 338 in a first mode of operation, and FIG. 3C schematically illustrates fuel injection from the pilot fuel injector 338 in a second mode of operation. Although not shown, the pilot fuel injector 338 can be configured within a combustor similar to that shown in FIG. 2, e.g., including a fuel injection controller and associated components. In such an embodiment or configuration, the pilot fuel injector 338 would be positioned where the first fuel injector 238 is located and shown in FIG. 2.

As shown in FIG. 3A, the pilot fuel injector 338 includes a swirler 346 and a nozzle 348 located therein. The nozzle 348 includes a primary fuel circuit 360 (e.g., pressure atomizer) at a tip of the nozzle 348 and a secondary circuit 362 that includes a first subcircuit 364 and a second subcircuit 366. Each of the subcircuits 364, 366 of the secondary circuit includes injection points or apertures that are axially separated from each other along a nozzle axis Z. That is, as shown, the nozzle 348 includes the first subcircuit 364 located at a first injection depth $D_1$ relative to a swirler exit 346a (FIG. 3B) and a second subcircuit 366 located at a second injection depth $D_2$ from the swirler exit 346a (FIG. 3C).

The injection apertures of the first subcircuit 364 are axially forward (relative to the engine) of the second subcircuit 366 along the nozzle 348 and, as such, the apertures of the first subcircuit 364 are farther from the swirler exit 346a than those of the second subcircuit 366. That is, the first injection depth $D_1$ is greater than the second injection depth $D_2$. Stated another way, the apertures of the first subcircuit 364 can provide an upstream injection within the swirler 346 and the second subcircuit 366 can provide a downstream injection within the swirler 346. The first and second subcircuits 364, 366 can include one or more injection apertures, depending on the design and operational requirements of the pilot injector 338. Further, the injection apertures can be radially oriented relative to the axis Z of the nozzle 348, tangentially or circumferentially oriented relative to the nozzle 348, or may have other orientation without departing from the scope of the present disclosure. The first and second subcircuits 364, 366 can be sourced from different fuel lines which can be fluidly connected to one or more fuel sources. For example, in some embodiments, valves or other flow control devices can be used to separate flow from a single fuel source. In other embodiments, separate manifolds can be employed for the first subcircuit 364 and the second subcircuit 366. Further still, in other embodiments, two separate fuel sources can be employed for the two separate subcircuits 364, 366. In other embodiments, the injection apertures of the subcircuits can be operable or controllable between open and closed positions to control fuel flow therethrough.

As shown in FIG. 3B, the pilot fuel injector 338 is shown operating in a first mode of operation. In the first mode of operation, fuel 368 is injected into the swirler 346 at the first injection depth $D_1$ from apertures 364a of the first subcircuit 364. During this mode of operation, fuel is reduced, limited, or otherwise restricted from being dispersed from apertures 366a of the second subcircuit 366.

As shown in FIG. 3C, the pilot fuel injector 338 is shown operating in a second mode of operation. In the second mode of operation, fuel 368 is injected into the swirler 346 at the second injection depth $D_2$ from apertures 366a of the second subcircuit 364. During this mode of operation, fuel is reduced, limited, or otherwise restricted from being dispersed from apertures 364a of the first subcircuit 364.

Figure 4A:
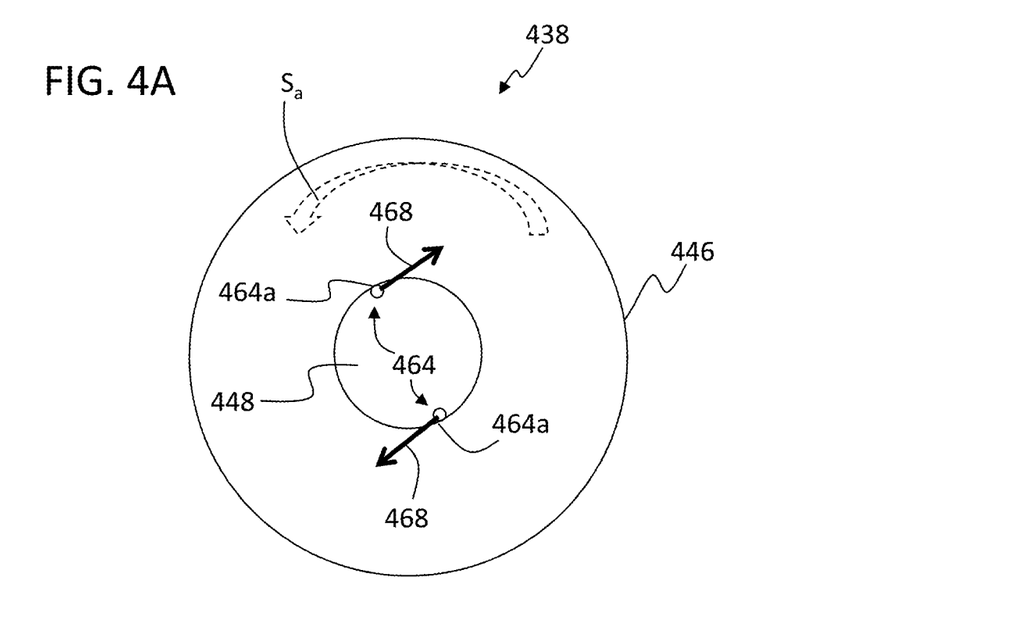
FIG. 4A is a schematic illustration of a fuel injection operation as injected from apertures of a pilot fuel injector in accordance with an embodiment of the present disclosure.
Figure 4B:
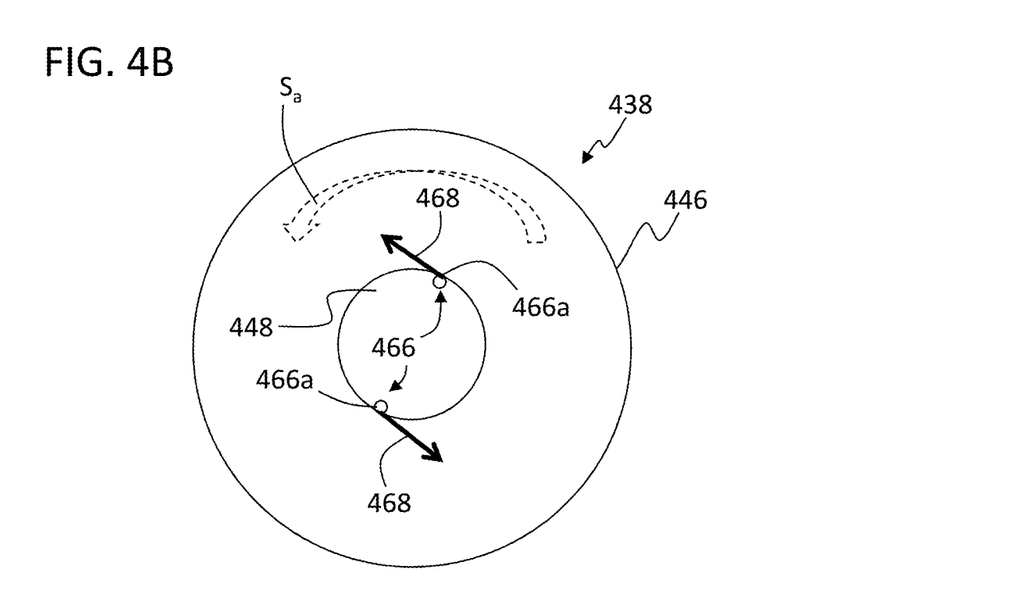
FIG. 4B is a schematic illustration of another fuel injection operation as injected from apertures of the pilot fuel injector of FIG. 4A.

Turning now to FIGS. 4A-4B, schematic illustrations of alternative modes of operation of a pilot fuel injector 438 in accordance with a non-limiting embodiment of the present disclosure are shown. FIG. 4A illustrates a fuel injection operation as injected from apertures 464a of a first subcircuit 464 into a swirler 446 (e.g., similar to the apertures 364a at the first injection depth $D_1$ shown in FIG. 3B). FIG. 4B illustrates a fuel injection operation as injected from apertures 466a of a second subcircuit 466 into the swirler 446 (e.g., similar to the apertures 366a at the second injection depth $D_2$ shown in FIG. 3C). As will be appreciated by those of skill in the art, FIGS. 4A-4B are views of the nozzle pilot fuel injector 438 as viewed from within a combustion chamber looking toward a swirler exit (see, e.g., FIGS. 2-3A).

As schematically illustrated, a direction of swirler air $S_a$ is shown in the dashed curved arrow. That is, in FIGS. 4A-4B, the swirler air $S_a$ is directed in a counter-clockwise direction by a configuration of swirler vanes, as known in the art. FIG. 4A illustrates that the first subcircuit 464 can be configured such that fuel 468 is directed out of the apertures 464a of the first subcircuit 464 in a counter-swirl direction (e.g., counter flow to the flow direction of the swirler air $S_a$). To achieve such direction injection of fuel 468, the apertures 464a of the first subcircuit 464 can be angled or oriented in a circumferential direction relative to the nozzle 448. FIG. 4B illustrates that the second subcircuit 466 can be configured such that fuel 468 is directed out of the apertures 466a of the second subcircuit 466 in a co-swirl direction (e.g., co-flow with the flow direction of the swirler air $S_a$). To achieve such direction injection of fuel 468, the apertures 466a of the second subcircuit 466 can be angled or oriented in a circumferential direction relative to the nozzle 448.

The direction of fuel injection can be optimized, such as shown and described with respect to FIGS. 4A-4B, and may be different for the first and second subcircuits (e.g., upstream and downstream injection locations). The apertures of the subcircuits can be oriented such that co-swirl or counter-swirl injection relative to a swirler air flow is achieved. For example, having the first subcircuit (e.g., upstream, further from swirler exit) inject fuel in a counter-swirl orientation can maximize fuel-air mixing for optimizing $NO_x$ emissions. In contrast, the second subcircuit (e.g., downstream, closer to swirler exit) can be oriented with a co-swirl configuration to reduce fuel-air mixing to improve stability, reduce effective immersion, and optimize tone mitigation.

Although shown in FIGS. 4A-4B with the first subcircuit 464 having a counter-swirl orientation and the second subcircuit 466 having a co-swirl orientation, those of skill in the art will appreciate that various orientations and/or combination of orientations can be employed without departing from the scope of the present disclosure. For example, in some configurations, both the first and second subcircuits can have the same orientation relative to the direction of flow of the swirler air. In other embodiments, one subcircuit can be configured to radially inject fuel (relative to a nozzle axis, e.g., axis Z in FIG. 3A) and the other subcircuit can be oriented with co- or counter-swirl injection.

Figure 5:
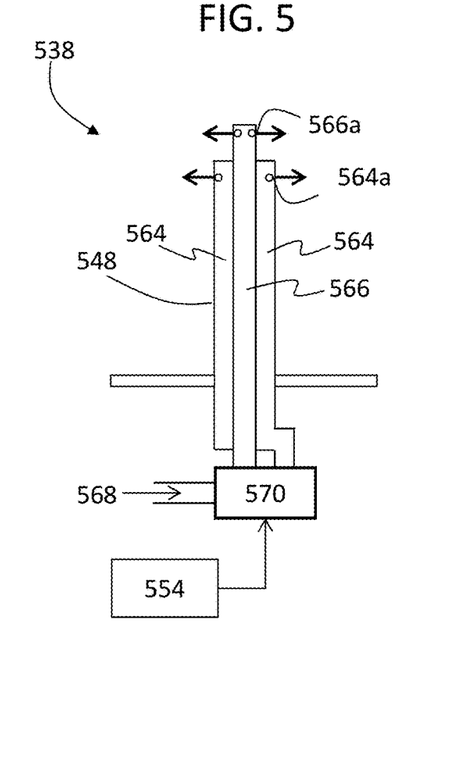
FIG. 5 is a schematic illustration of a fuel supply configuration and control system to supply fuel to a pilot fuel injector in accordance with the present disclosure.
Figure 6:
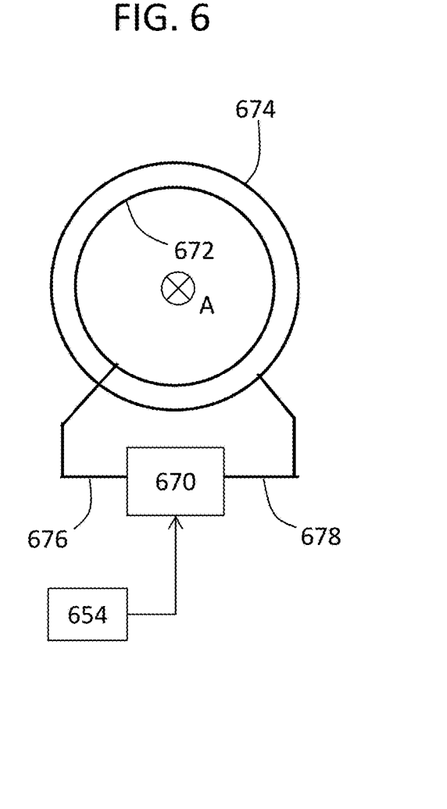
FIG. 6 is a schematic illustration of another fuel supply configuration and control system to supply fuel to a pilot fuel injector in accordance with the present disclosure.

Turning now to FIGS. 5-6, schematic illustrations of fuel supply to pilot fuel injectors in accordance with the present disclosure are shown. FIG. 5 illustrates a pilot fuel injector 538 having a nozzle 548 with a first subcircuit 564 and a second subcircuit 566, similar to that shown and described above. The first subcircuit 564 includes injection apertures 564a toward an end of the nozzle 548 and the second subcircuit 566 includes injection apertures 566a toward the end of the nozzle 548 (see, e.g., FIGS. 3A-3C). Fuel supply to the first and second subcircuits 564, 566 can be controlled by a fuel injection controller 554 (e.g., as described above).

The fuel injection controller 554 can control fuel 568 by controlling a flow regulation unit 570. The flow regulation unit 570 can be a mechanical flow divider valve, an electrically actuated flow divider valve, a manifold configuration wherein fuel can be directed to one or both of the manifolds, or other flow control/restriction mechanism as known in the art. The fuel injection controller 554 can control the flow regulation unit 570 to enable some or all fuel to be supplied to one of the first and second subcircuits 564, 566. In some configurations, some minimum fuel supply may be provided to both of the subcircuits 564, 566 to prevent coking of the fuel within the subcircuit (e.g., some amount of flow through will always occur). In the embodiment of FIG. 5, each pilot fuel injector of a gas turbine engine can include a dedicated or associated flow regulation unit. In some embodiments, a single flow regulation unit can be configured to control flow to first and second subcircuits of multiple injection nozzles. The fuel injection controller is operably connected to the flow regulation unit(s) to control flow therethrough.

FIG. 6 schematically illustrations an alternative configuration of flow regulation to pilot fuel injectors in accordance with embodiments of the present disclosure. In the embodiment of FIG. 6, separate manifolds are fluidly connected to all or a subset of first subcircuits and all or a subset of second subcircuits. The illustration of FIG. 6 is an end-on view along an engine axis A (see, e.g., FIGS. 1A-1B). As shown, a first fuel manifold 672 is configured about the engine axis A and is fluidly connected to one or more (or all) of the first subcircuits in a combustion configuration having pilot fuel injectors having first and second subcircuits similar to that shown and described above. A second fuel manifold 674 is configured about the engine axis A and is fluidly connected to one or more (or all) of the second subcircuits of the pilot fuel injectors. As schematically shown, a single flow regulation unit 670 is controlled by a fuel injection controller 654. The flow regulation unit 670 is fluidly connected to and configured to control a fluid through a first supply line 676 that is connected to the first fuel manifold 672 and a second supply line 678 that is connected to the second fuel manifold 674.

Accordingly, a fuel injection controller in accordance with the present disclosure can be configured to control fuel flow through one or both of first and second subcircuits to thus control fuel injection through a pilot fuel injector. The flow regulation unit(s) can be configured to control flow to one or more subcircuits depending on the configuration, as shown and described above.

Advantageously, various embodiments described herein enable control of combustion dynamics within a combustor of a gas turbine engine. Various embodiments can be applied in axially-staged, lean-lean combustor configurations. Embodiments of the present disclosure include mitigation measures that can be fine-tuned and/or optimized to mitigate combustion dynamics while also meeting all other combustor performance metrics (e.g., programming of the fuel injection controller, etc.). Further, advantageously, embodiments provided herein enable optimized control and fuel injection within combustors, thus enabling performance and/or operational mode efficiency improvements.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, as described and shown herein, the direction of fuel injection can be different from radial (relative to a nozzle axis) and can be optimized specifically for the upstream and downstream injection locations (e.g., first and second subcircuits). For example, the upstream fuel jets can be directed to inject counter to a swirl direction of the air flow at high power engine operation to maximize fuel-air mixing within the injector and minimize $NO_x$ emissions. The downstream fuel jets can be directed to inject with the swirl direction of the air flow at low power to reduce fuel-air mixing and improve flame stability and reduce combustor tones/instabilities.

Accordingly, the present disclosure is not to be seen as limited by the foregoing description, but is only limited by the scope of the appended claims.

What is claimed is:

1. A pilot fuel injector for a combustor of a gas turbine engine, the pilot fuel injector comprising:
   a swirler having an exit into a combustion chamber of the combustor; and
   a nozzle located within the swirler, the nozzle having:
   a primary fuel circuit configured to atomize fuel dispensed therethrough; and
   a secondary fuel circuit having a first subcircuit having at least one injection aperture located at a first injection depth from the exit of the swirler and a second subcircuit having at least one second injection aperture located at a second injection depth from the exit of the swirler, wherein the first injection depth is greater than the second injection depth,
   wherein the first subcircuit and the second subcircuit are configured to dispense fuel into a single volume within the swirler,
   wherein a tip of the nozzle is located an immersion depth from the exit of the swirler, and wherein the second injection depth is greater than the immersion depth.

2. The pilot fuel injector of claim 1, wherein the nozzle defines a nozzle axis, wherein the apertures of one or both of the first and second subcircuits are oriented to dispense fuel in a direction radially relative to the nozzle axis.

3. The pilot fuel injector of claim 1, wherein the nozzle defines a nozzle axis, wherein the apertures of the first subcircuit are oriented to dispense fuel in a direction circumferentially relative to the nozzle axis.

4. The pilot fuel injector of claim 3, wherein the swirler dispenses air in a swirler direction and wherein the direction of orientation of the apertures of the first subcircuit is directed in a direction opposite the swirler direction.

5. The pilot fuel injector of claim 4, wherein the apertures of the second subcircuit are oriented to dispense fuel in a direction circumferentially relative to the nozzle axis and in a direction that is the same as the swirler direction.

6. The pilot fuel injector of claim 1, further comprising a fuel injection controller configured to control fuel flow through the first and second subcircuits.

7. The pilot fuel injector of claim 6, further comprising a fuel regulation unit that is operably controlled by the fuel injection controller and configured to restrict or enable flow to one or both of the first and second subcircuits.

8. The pilot fuel injector of claim 7, wherein the fuel regulation unit is one of a mechanical flow divider valve or an electrically actuated flow divider valve.

9. The pilot fuel injector of claim 6, wherein the fuel injection controller is configured to (i) direct more fuel through the first subcircuit during a high power operation of the gas turbine engine and (ii) direct more fuel through the second subcircuit during a low power operation of the gas turbine engine.

10. A pilot fuel injector for a combustor of a gas turbine engine, the pilot fuel injector comprising:
    a swirler having an exit into a combustion chamber of the combustor; and
    a nozzle located within the swirler, the nozzle having:
    a primary fuel circuit configured to atomize fuel dispensed therethrough; and
    a secondary fuel circuit having a first subcircuit having at least one injection aperture located at a first injection depth from the exit of the swirler and a second subcircuit having at least one second injection aperture located at a second injection depth from the exit of the swirler, wherein the first injection depth is greater than the second injection depth,
    wherein the nozzle defines a nozzle axis, wherein the apertures of the first subcircuit are oriented to dispense fuel in a direction circumferentially relative to the nozzle axis, and
    wherein the swirler dispenses air in a swirler direction and wherein the direction of orientation of the apertures of the first subcircuit is directed in a direction opposite the swirler direction.

11. An aircraft engine comprising:
    an axially-staged lean-lean combustor defining a combustion chamber, the combustor having:
    a pilot fuel injector positioned at a forward end of the combustor, the pilot fuel injector comprising:
    a swirler having an exit into the combustion chamber; and
    a nozzle located within the swirler, the nozzle having:
    a primary fuel circuit configured to atomize fuel dispensed therethrough; and
    a secondary fuel circuit having a first subcircuit having at least one injection aperture located at a first injection depth from the exit of the swirler and a second subcircuit having at least one second injection aperture located at a second injection depth from the exit of the swirler, wherein the first injection depth is greater than the second injection depth,
    wherein the first subcircuit and the second subcircuit are configured to dispense fuel into a single volume within the swirler,
    wherein a tip of the nozzle is located an immersion depth from the exit of the swirler, and wherein the second injection depth is greater than the immersion depth.

12. The aircraft engine of claim 11, wherein the nozzle defines a nozzle axis, wherein the apertures of one or both of the first and second subcircuits are oriented to dispense fuel in a direction radially relative to the nozzle axis.

13. The aircraft engine of claim 11, wherein the nozzle defines a nozzle axis, wherein the apertures of the first subcircuit are oriented to dispense fuel in a direction circumferentially relative to the nozzle axis.

14. The aircraft engine of claim 13, wherein the swirler dispenses air in a swirler direction and wherein the direction of orientation of the apertures of the first subcircuit is directed in a direction opposite the swirler direction.

15. The aircraft engine of claim 14, wherein the apertures of the second subcircuit are oriented to dispense fuel in a direction circumferentially relative to the nozzle axis and in a direction that is the same as the swirler direction.

16. The aircraft engine of claim 11, further comprising a fuel injection controller configured to control fuel flow through the first and second subcircuits.

17. The aircraft engine of claim 16, further comprising a fuel regulation unit that is operably controlled by the fuel injection controller and configured to restrict or enable flow to one or both of the first and second subcircuits.

18. The aircraft engine of claim 16, wherein the fuel injection controller is configured to (i) direct more fuel through the first subcircuit during a high power operation of the gas turbine engine and (ii) direct more fuel through the second subcircuit during a low power operation of the gas turbine engine.

19. The aircraft engine of claim 11, further comprising at least one radially oriented main fuel injector located at a position aftward from the pilot fuel injector and configured to inject fuel into the combustion chamber.

* * * * *